United States Patent [19]
Takahashi et al.

[11] 4,409,457
[45] Oct. 11, 1983

[54] SYSTEM FOR MANUFACTURING TIRE MOLDING METAL MOLDS WITH ELECTRICAL DISCHARGE MACHINING

[75] Inventors: Kenichi Takahashi; Koichi Hirano, both of Kodaira; Shoji Futamura, Kawasaki, all of Japan

[73] Assignees: Bridgeport Tire Co. Ltd.; Institute of Technology Precision Electrical Discharge Works, both of Japan

[21] Appl. No.: 126,199

[22] Filed: Mar. 3, 1980

[30] Foreign Application Priority Data

| Mar. 8, 1979 | [JP] | Japan | 54-26919 |
| Jun. 20, 1979 | [JP] | Japan | 54-77653 |
| Jun. 20, 1979 | [JP] | Japan | 54-77654 |
| Jun. 20, 1979 | [JP] | Japan | 54-77655 |
| Aug. 6, 1979 | [JP] | Japan | 54-100046 |
| Dec. 10, 1979 | [JP] | Japan | 54-160000 |

[51] Int. Cl.³ .............................................. B23P 1/08
[52] U.S. Cl. ............................ 219/69 M; 219/69 E; 51/237 R; 51/59 R
[58] Field of Search ................ 219/69 R, 69 M, 69 V, 219/69 G, 69 E; 51/58, 59 R, 68, 237 R

[56] References Cited

U.S. PATENT DOCUMENTS

| 3,694,610 | 9/1972 | Saito et al. | 219/69 M |
| 3,777,595 | 12/1973 | Hausermann et al. | 219/69 M |
| 3,949,185 | 4/1976 | Roach | 219/69 R |
| 3,952,179 | 4/1976 | Baker | 219/69 R |
| 3,959,929 | 6/1976 | Fleischmann et al. | 219/69 R |
| 4,100,388 | 7/1978 | Meyer | 219/69 M |
| 4,132,038 | 1/1979 | O'Connor | 219/69 M |
| 4,247,748 | 1/1981 | Sato et al. | 219/69 M |

*Primary Examiner*—M. H. Paschall
*Attorney, Agent, or Firm*—McGlew and Tuttle

[57] ABSTRACT

A system for manufacturing tire molding metal molds with electrical discharge machining is disclosed, which makes possible the rotation, longitudinal and cross feeding of a work table on which a workpiece to be machined into a tire molding metal mold is placed and the rotation, lifting and lowering of a machining head, whereby the workpiece is discharge-machined by feeding a discharge machining electrode in a plurality of different directions corresponding to a plurality of projections protruding essentially vertical to the tire molding surface of the tire molding metal mold to be machined, and by changing electrodes having such profiles as to prevent the excess metal removal of the projections in accordance with each of the electrode feeding directions.

24 Claims, 21 Drawing Figures

SYSTEM FOR MANUFACTURING TIRE MOLDING METAL MOLDS WITH ELECTRICAL DISCHARGE MACHINING

BACKGROUND OF THE INVENTION

1. Field of the Invention

This invention relates generally to a system for manufacturing tire molding metal molds using electrical discharge machining, and more particularly to a system for manufacturing tire mounting metal molds, made of a single material and composed of a single block, with electrical discharge machining using an electrical discharge machining equipment with high accuracy and low manufacturing costs.

2. Description of the Prior Art

In general, tires used for automobiles, etc. have multiple grooves on the tread. Those grooves are usually provided on a tire in such a fashion that they are disposed normal to the curved surface of the tire tread so that they are kept perpendicular to the ground surface when the tire comes in contact with the ground.

In manufacturing molds for molding tires used for automobiles, therefore, it is necessary to form projections which protrude in the direction of the normal lines of the curved surface of the tire tread. This results in complicated mold forming processes. It should be noted that provision of multiple projections on a tire mold causes no problems in releasing the molded tire from the mold since the tire being molded is generally made of resilient rubber.

As described above, tire molds are usually manufactured with complicated processes as follows.

(a) A model of the same dimentions and shape as the radially divided n equal sections of a tire is cast from gypsum, etc. On this gypsum model, patterns or grooves on the tire tread are manually engraved.

(b) Using said gypsum model as a matrix, p (p is smaller than (n) pieces of inversed models are cast from resin, etc. and assembled to form several split models of circular arc shape.

(c) Gypsum is then poured into said split inversed models. The resulting gypsum split models are assembled in a circular shape to form an integral casting mold.

(d) Using said gypsum casting mold as a matrix, a metal mold for molding a tire is cast with aluminum precision casting, etc.

(e) A desired tire metal mold is manufactured by fitting said metal mold into an iron chase having an annular inside surface which engages with the outer circumference of said metal mold.

The tire metal mold manufactured with the aformentioned processes (a) through (e) involves not only high manufacturing costs resulting from complicated manufacturing processes but also the problem of accuracy in assembling p pieces of split inversed molds into a circular shape and the problem of strain in the metal mold caused by the difference of the coefficients of thermal expansion between aluminum of the mold and iron of the chase during heating in molding tires.

To overcome these problems, it has naturally been considered to manufacture a one-piece tire mold made of a single material by means of electrical discharge machining equipment now widely used in machining metal molds. The manufacture of tire molds by electrical discharge machining, however, has the following problems.

Figure 1:
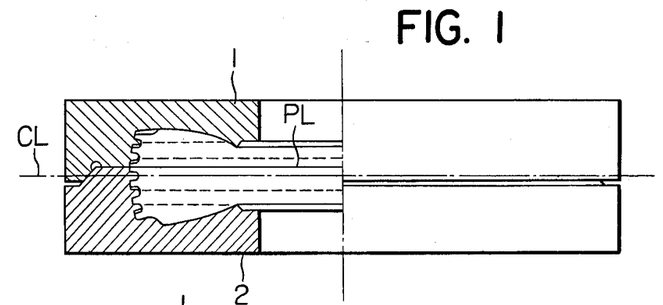
FIG. 1 is a side cross-sectional view of a tire molding metal mold.
Figure 2:
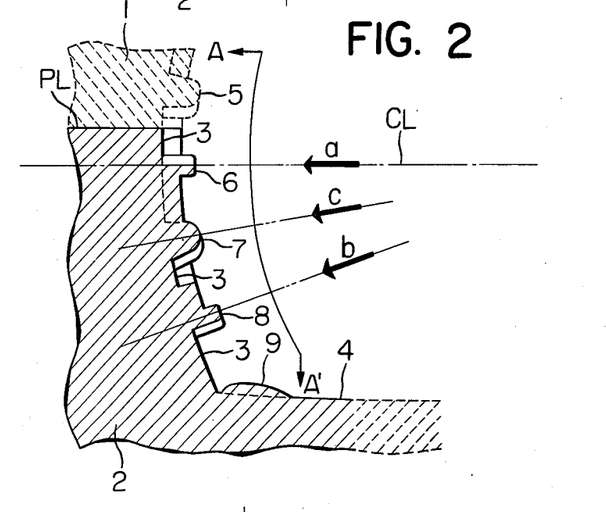
FIG. 2 is a partially enlarged view of the lower metal mold of the mold shown in FIG. 1.
Figure 3:
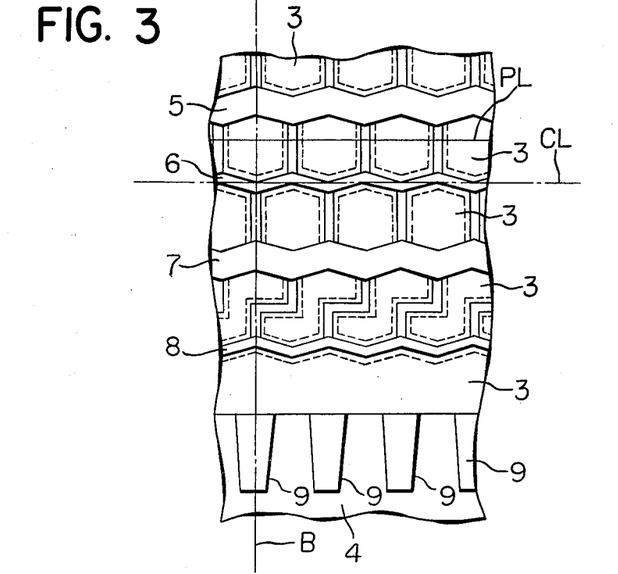
FIG. 3 is a development of the lower metal mold shown in FIG. 2, taken along the line A—A'.

In the electrical discharge machining of metal molds such as blanking dies, drawing dies, molding tools, etc. the molding surface of which can be projected from a single direction without shaded-portions, an electrode having a shape corresponding to the molding surface of the metal mold is fed in a predetermined direction and at a predetermined position. However, in manufacturing tire metal molds as shown in FIGS. 1 through 3 with electrical discharge machining, it is impossible to complete metal molds with electrical discharge machining in a single direction. The reasons for this will be described in the following, referring to FIGS. 1 through 3.

In FIGS. 1 through 3, numeral 1 refers to an upper metal mold; 2 to a lower metal mold; 3 to the contour surface thereof corresponding to the tread surface of a tire to be molded; 4 to the shoulder portion thereof; 5 through 9 to projections, respectively. Symbol PL refers to the parting line of the molds along which the upper and lower metal molds 1 and 2 are split; CL to the center line of the tread surface of the tire being molded, respectively.

In general, a plurality of grooves are provided on the curved tire tread surface. Consequently, the projections 6, 8 corresponding to the tire grooves are formed on tire molds, for example on the lower metal mold 2 as shown in FIG. 2 in such a manner that the projections 6, 8 protrude essentially vertical to the curved contour surface 3 which corresponds to the tire tread surface when not in contact with the ground. The machining of the contour surface 3 having more than two rows of projections protruding essentially vertical to the contour surface by feeding an electrode (not shown) having a profile corresponding to the lower metal mold 2 being machined in any direction, for example, in any of the directions shown by arrows a, b and c in FIG. 2 may cause excess metal removal in any one or both of the projections 6 and 8.

SUMMARY OF THE INVENTION

It is an object of this invention to provide a manufacturing system of tire molding metal molds with electrical discharge machining, which is capable of eliminating excess metal removal in machining a plurality of projections essentially vertical to the contour surface of a tire metal mold to be machined.

It is another object of this invention to provide a manufacturing system of tire molding metal molds with electrical discharge machining including an electrode manufacturing equipment capable of manufacturing a multiplicity of discharge machining electrodes of different types with high accuracy and low manufacturing costs.

It is still another object of this invention to provide a manufacturing system of tire molding metal molds with electrical discharge machining having a means for improving accuracy in relative positional relationship between the discharge machining surface of each of the discharge machining electrodes of different types and the electrode mounting surface of an electrode mounting jig.

It is a further object of this invention to provide a manufacturing system of tire molding metal molds with electrical discharge machining, which is capable of setting the feeding direction of the discharge machining electrode at any angle and determining with ease and accuracy the relative position of the discharge machining electrode and the workpiece at a given feeding angle.

It is still a further object of this invention to provide a manufacturing system of tire molding metal molds with electrical discharge machining, which is capable of machining tire metal molds having sharp edges.

It is still a further object of this invention to provide a manufacturing system of tire molding metal molds with electrical discharge machining, which is capable of continuing discharge machining, even when a shortcircuiting occurs during machining, by eliminating the shortcircuited state.

BRIEF DESCRIPTION OF THE DRAWINGS

FIGS. 5 (A) and (B) are front and side elevations of an electrical discharge machining equipment according to this invention;

FIGS. 8 (A) and (B) are an elevation and a plan view illustrating a profile model tilting mechanism used in the electrode manufacturing equipment shown in FIG. 6;

FIGS. 12 (A) through (C) are diagrams of assistance in explaining the process of electrode wear during electric discharge machining;

DETAILED DESCRIPTION OF THE INVENTION

The metal mold manufacturing process in a manufacturing system of tire molding metal molds with electric discharge machining embodying this invention will be described in the following, referring to FIG. 4. Numeral 2' in the figure refers to a workpiece; 10a and 10b to discharge machining electrodes; 11 to an electrode mounting jig which is fixed to a machining head (not shown); 3a and 3b to the contour surfaces of the discharge machining electrodes 10a and 10b corresponding to the contour surface 3 of the lower mold 2 being machined in FIG. 4 (A); 6a through 9a and 6b through 9b to grooves formed on the discharge machining electrodes 10a and 10b corresponding to the projections 6 through 9 of the lower mold 2; and other numerals correspond to like numerals in FIG. 2, respectively.

Figure 4A:
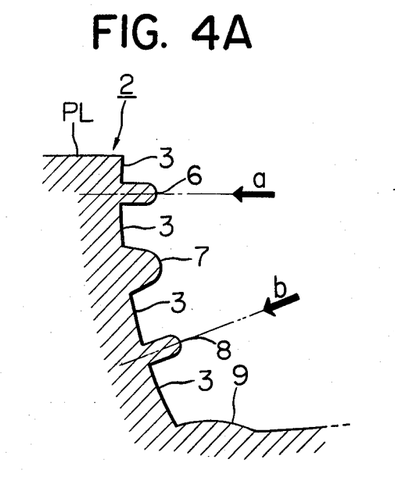
FIGS. 4(A) through (C) are diagrams illustrating the manufacturing process of tire molding metal molds with electrical discharge machining according to this invention.
Figure 4B:
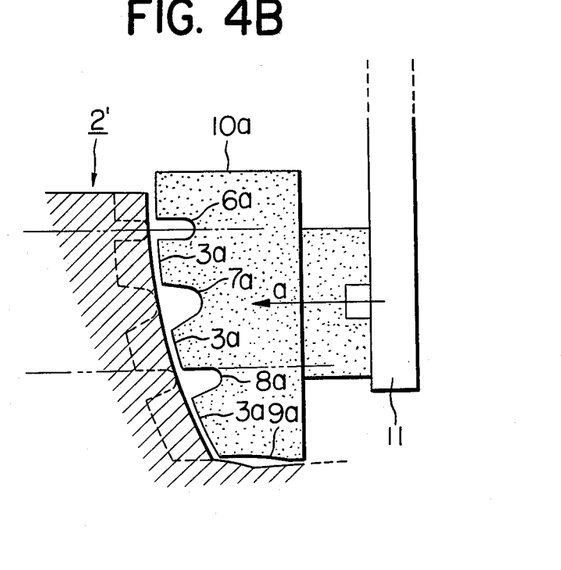
Figure 4C:
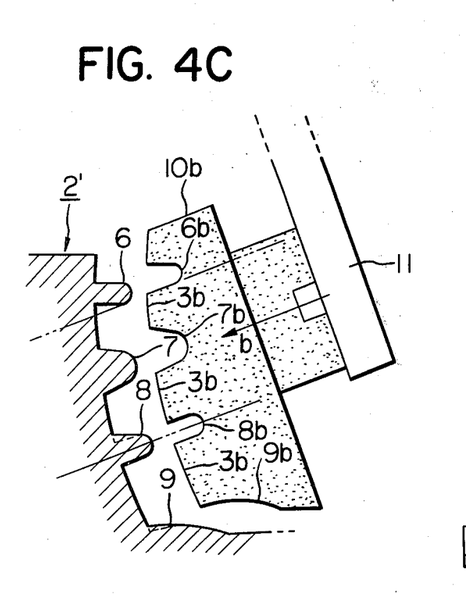

FIG. 4 (A) is a cross-sectional view of the lower mold 2 of the tire molding metal mold being machined in FIGS. 1 through 3. On the lower mold 2 shown in FIG. 4 (A), the projections 6 and 8 protrude essentially vertical to the curved contour surface 3. In discharge machining a metal mold having a plurality of projections protruding vertical to the curved contour surface thereof, the use of a single electrode having a profile exactly corresponding to that of the metal mold being machined may inevitably interfere any of the projections being machined in any one feeding direction, causing unwanted metal removal of any of them since they protrude vertical to the curved contour surface. In the manufacturing system of tire molding metal molds of this invention, therefore, discharge machining is carried out by feeding the electrode in different directions in accordance with the protruding directions of projections, for example in directions shown by the arrows a and b in FIG. 4 (A), and using different electrodes having different profiles, which will be described later, in accordance with the feeding directions a and b. The states of discharge machining in the feeding directions a and b are shown in FIGS. 4 (B) and (C). The electrode 10a used in discharge machining in the direction a has the grooves 8a and 9a of such a profile as to prevent excess metal removal of the projections being machined, as shown in FIG. 4 (B), the other portions thereof being formed into a profile corresponding to that of the lower mold 2 being machined. Similarly, the electrode 10b, as shown in FIG. 4 (C), has the groove 6b of such a profile as to prevent excess metal removal of the projection 6, with the other portions thereof being formed into a profile corresponding to that of the lower mold 2 being machined. Needless to say, the profile and dimensions of the electrodes 10a and 10b are determined taking into account spark gaps. In order to machine the lower mold 2 of such a profile as shown in FIG. 4 (A), the electrode 10a is first set as shown in FIG. 4 (B) and fed in a direction shown by the arrow a in the figure to discharge machine the workpiece into a profile shown by the dotted line in the figure. Next, the workpiece is machined using the electrode 10b, in place of the electrode 10a, in a direction shown by the arrow b in FIG. 4 (C) to remove the portions shown by the dotted lines of the projections 8 and 9 which have been left unmachined in the preceding machining process as shown in FIG. 4 (B) to obtain the desired profile of the lower metal mold 2 shown in FIG. 4 (A). During the aforementioned discharge machining process, the desired profile of the lower mold 2 as shown in FIG. 4 (A) can be obtained without excess metal removal in the projections since the grooves 8a and 9a on the electrode 10a for machining in the direction a and the groove 6a on the electrode 10b for machining in the direction b are formed into such profiles as shown in the figures. In the foregoing description of the metal mold manufacturing process in a manufacturing system of tire molding metal molds according to this invention, it is assumed that the machining process shown in FIG. 4 (B) is followed by the machining process shown in FIG. 4 (C). The sequence of the processes, however, may be reversed, i.e., in the order of the machining process shown in FIG. 4 (C) followed by the machining process shown in FIG. 4 (B).

In the foregoing, a general description has been made on the metal mold manufacturing process in a tire molding metal mold manufacturing system of this invention. In the actual discharge machining of a tire molding metal mold the internal circumference of which is of an annular shape, however, the annular internal circumference of the tire molding metal mold has to be divided into circumferential sections in accordance with the size of the working surface of the electrode. In addition, the profile of the internal circumference of the entire metal mold formed by assembling the metal mold sections thus machined must be continuous without misalignment, as shown in FIG. 3. This requires a discharge machining equipment capable of accurately positioning the electrode and the workpiece and accurately setting the electrode feeding angle as shown by the directions a and b in the foregoing description.

Figure 5A:
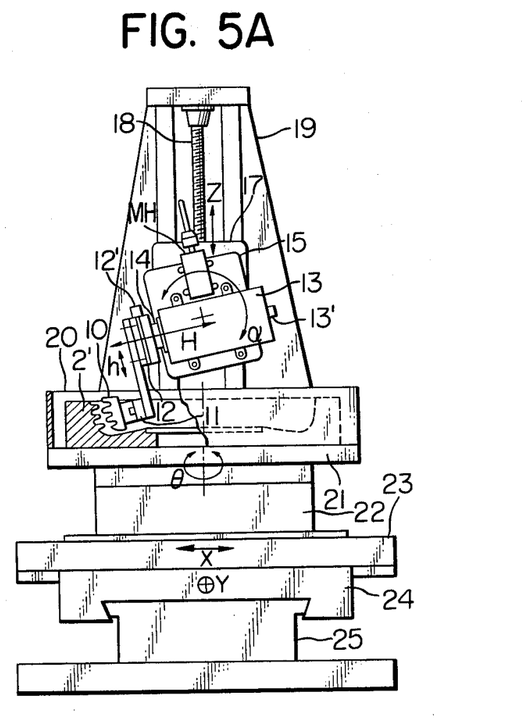
Figure 5B:
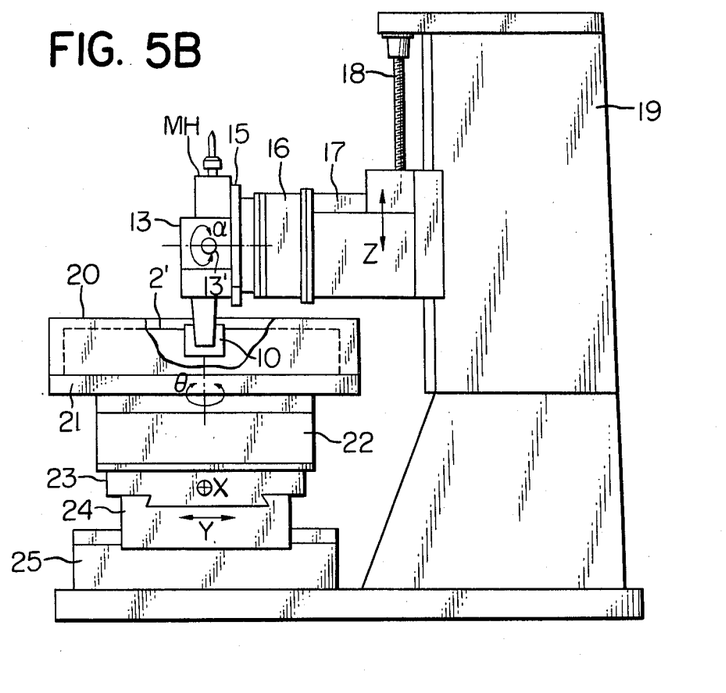

FIG. 5 shows an electric discharge machining equipment used in a tire molding metal mold manufacturing system of this invention. Numeral 2' in FIG. 5 refers to a workpiece; 10 to a machining electrode; 11 to an electrode mounting jig; 12 to a second machining head for feeding the electrode 10 via the electrode mounting jig 11 in a direction shown by the arrow h in the figure; 12' to a pulse motor for servo-driving the second machining head 12; 13 to a first machining head for feeding the second machining head 12 in a direction shown by the arrow H in the figure. 13' to a pulse motor for servo-driving the first machining head 13; 14 to a spindle of the first machining head 13; 15 to a head support; 16 to a drive unit for rotating the head support 15 in a direction shown by the arrow α in the figure; 17 to a lifting block for supporting the head support drive unit 16, which is supported by a column 19 in such a manner that the lifting block 17 can be lifted and lowered by means of a lifting screw 18 in a direction shown by the arrow Z in the figure; 20 to a discharge machining tank; 21 to a work table on which a workpiece 2' is placed; 22 to a table rotating drive unit for rotating (servo-driving) the work table 21 in a direction shown by the arrow θ in the figure by means of, for example, a pulse motor or a hydraulic unit; 23 to a first table for moving the work table 21, together with the table rotating drive unit 22, in a direction shown by the arrow X in the figure; 24 to a second table for moving the first table 23 in a direction shown by the arrow Y in the figure; and 25 to a bed, respectively. Symbol MH denotes a milling head for mechanically milling the workpiece 2'.

An electrical discharge equipment for manufacturing a tire molding metal mold made of a single material and composed of a single block as shown in FIGS. 1 through 3 is required to be capable of feeding the interchangeable electrodes 10a and 10b in directions shown by the arrows a and b, respectively as well as setting with ease and accuracy the relative position of the electrode 10a or 10b and the workpiece 2'. Consequently, the electric discharge machining equipment according to this invention as shown in FIG. 5 is capable of setting the feeding direction H of the first machining head 13 in any desired direction because the head support 15 is constructed rotatably in a direction shown by the arrow α in the figure. That is, the electrical machining equipment shown in FIG. 5 is capable of setting the feeding direction of the electrode 10 in any desired direction, for example as shown by the arrow a or b in FIG. 4. The relative position between the workpiece 2' placed on the work table 21 (in such a manner that the center of the workpiece 2' agrees with the rotating center in the direction θ of the work table 21) and the electrode 10 can be set as desired by lifting and lowering the lifting block 17 in the direction Z, and rotating and moving the work table 21 in the direction θ and the directions X and Y, respectively. That is, the electrode 10 can be set to a reference position for starting discharge machining (the detailed description of the reference position setting of the electrode 10 will be given later). Once the electrode 10 has been set to the reference position in this way, the first machining head 13 is controlled by the pulse motor 13' to drive the spindle 14 in the direction H. On the tip of the spindle 14, mounted is the second machining head 12, which can be driven by the pulse motor 12' via the electrode mounting jig 11 to drive the electrode 10 in the direction h. Description here is baed on the assumption that the second machining head 12 is in the stationary state (the operation of the second machining head 12 will be described later). In this case, therefore, the electrode 10 is fed through the servo-driving of the spindle 14 by the pulse motor 13' controlling the first machining head 13. The pulse motor 13' is controlled in accordance with predetermined machining conditions, that is, the setting conditions of the voltage across the electrode 10 and the workpiece 2', discharge current, etc. so that the gap between the electrode 10 and the workpiece 2' is kept constant at all times as the discharge machining proceeds. Appropriate hydraulic servo mechanisms and other automatic servo mechanisms may be used in place of the pulse motors 13' and 12' for electrically controlling the first and second machining heads 13 and 12. Furthermore, in installing the first machining head 13 to the head support 15, the length in the direction h shown in FIG. 5A of the arm to which the electrode mounting jig 11 is mounted can be sufficiently reduced to increase the rigidity of the arm by fixing the first machining head 13 at a position as close as possible to the machining table 21 as long as the first machining head 13 can be fixed to the head support 15 or the position where the distance between the rotational center axis of the head support 15 and the central axis (shown by arrow H. in FIG. 5A) of the spindle 14 is kept as far as possible.

Furthermore, the electrical discharge machining equipment used in this invention is capable of mechanical milling operation by means of the milling head MH mounted on the head support 15, as shown in FIG. 5. That is, the arrangement that permits the rotation, lifting and lowering of the head support 15 and the rotation, longitudinal and cross feed of the work table 21 makes it possible to mechanically machine the workpiece into any desired shape. In machining a workpiece of a relatively simple shape, mechanical machining generally has a higher machining rate than discharge machining. Therefore, the machining efficiency of tire molding metal molds can be further improved by mechanically machining those mold portions of relatively simple shape with the milling head MH and discharge machining those portions of complex shape.

In the foregoing, the positioning of the electrode 10 and the workpiece, the feeding angle setting (in the direction H in the figure) of the electrode 10 and the discharge machining of the workpiece by means of the first and second machining heads 13 and 12 have been described. As described in the beginning of this Specification, the lower tire molding metal mold 2 as shown in FIGS. 1 through 3 can be manufactured by repeating the discharge machining with the electrode 10a in a direction shown by the arrow a in FIG. 4 and the discharge machining with the electrode 10b in a direction shown by the arrow b in the figure over the entire internal circumference of the workpiece 2' of annular shape while rotating the work table 21. Consequently, a multiplicity of the electrodes 10a and 10b are required to manufacture the lower mold 2. Furthermore, the wear of electrodes during discharge machining requires the replacement of electrodes with new ones in accordance with the degree of electrode wear.

As described above, the manufacture of tire molding metal molds with electrical discharge machining requires (I) the manufacture of a multiplicity of interchangeable electrodes of varied types with accuracy and low manufacturing costs, and (II) the setting of the interchangeable electrodes with ease and accuracy to a reference point for starting discharge machining.

To satisfy these conditions (I) and (II) above, the tire molding metal mold manufacturing system with discharge machining according to this invention has the following means.

First, description will be made on an example of the electrode manufacturing equipment for manufacturing electrodes used in this invention, referring to FIGS. 6 through 10. Numerals 3a and 6a through 10a, and 3b and 6b through 10b in the figures correspond with like numerals in FIG. 4. Numeral 10′ refers to a workpiece being machined into an electrode; 26 to a copying model; 27 to a cutter; 28 to a stylus; 29 to a locating groove on the workpiece 10′; 30 to a locating groove on the copying model 26; 31 to a mounting surface of the workpiece 10′; 32 to a milling head; 33 to a copying head; 34 to a head feed device; 35 to a work table; 36 to a locating projection; 37 to a model table; 38 to a bracket; 39 to a bracket support; 40 to an X-axis tilting handle; 41 to a Y-axis tilting handle; 42 and 43 to set bolts; 44 and 45 to cross tables; 46 through 49 to table feed handles, respectively. Numeral 3′ to a contour surface of the model 26; 5′ through 9′ to grooves on the model 26, all of which are formed on the model 26 corresponding with the contour surface 3 and the projections 5 through 9 of the tire molding metal mold being formed as shown in FIGS. 1 through 4; β to an angle at which the extensions of the center lines of the model grooves 6′ and 8′ on the copying model 26 intersect, respectively. It can be considered that a single model having an inversed profile of the lower mold 2 as shown in FIG. 4 (A) is used as the copying model 26 based on which the electrode as shown in FIGS. 4 (B) and (C) is manufactured.

Figure 6:
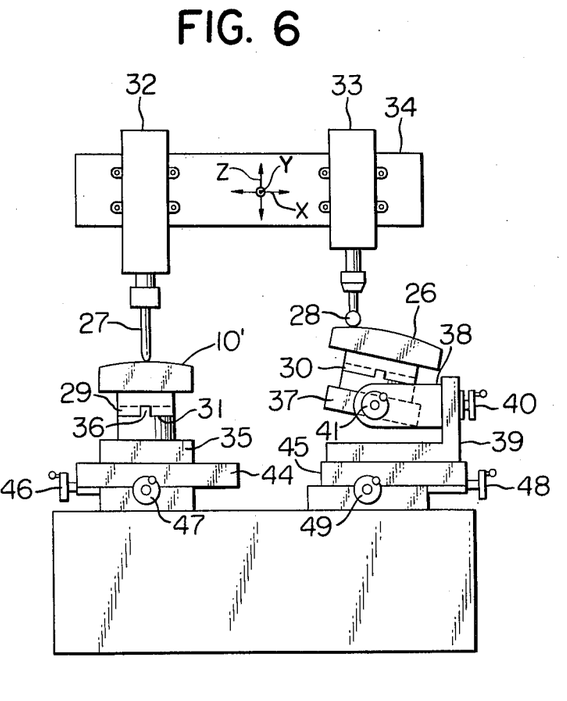
FIG. 6 is an elevation of an electrode manufacturing equipment for manufacturing discharge machining electrodes used for this invention.
Figure 7:
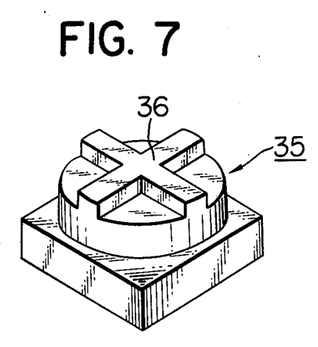
FIG. 7 is a perspective view of a workpiece mount used in the electrode manufacturing equipment shown in FIG. 6.
Figure 9:
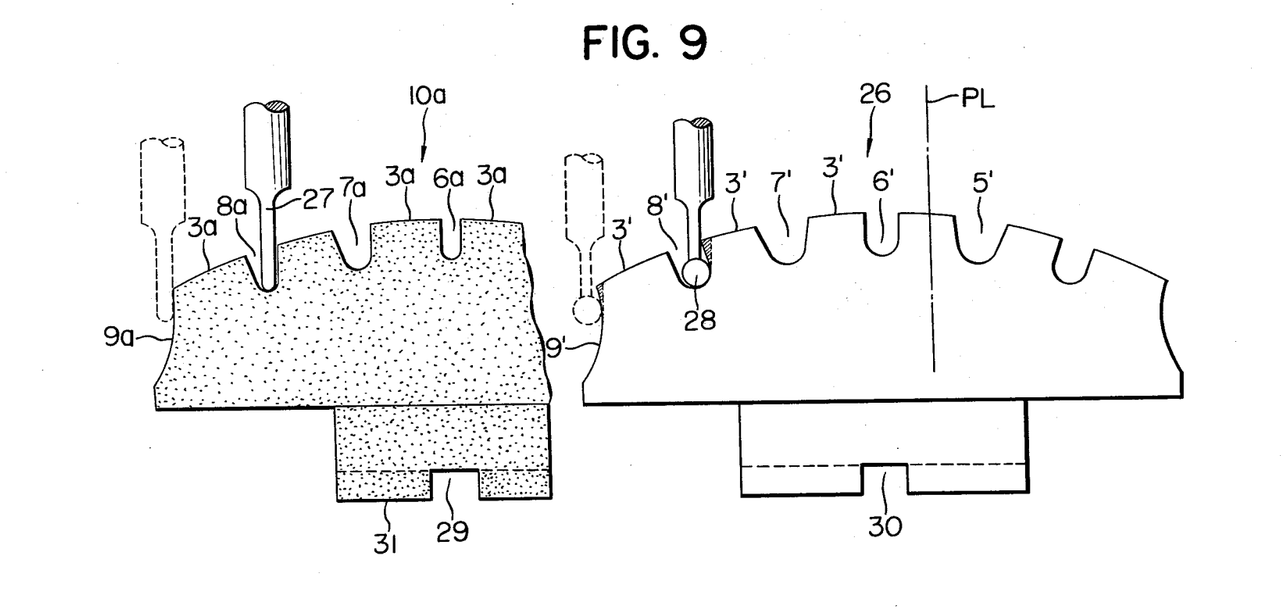
FIGS. 9 and 10 are diagrams of assistance in explaining the manufacture of discharge machining electrodes according to this invention.
Figure 10:
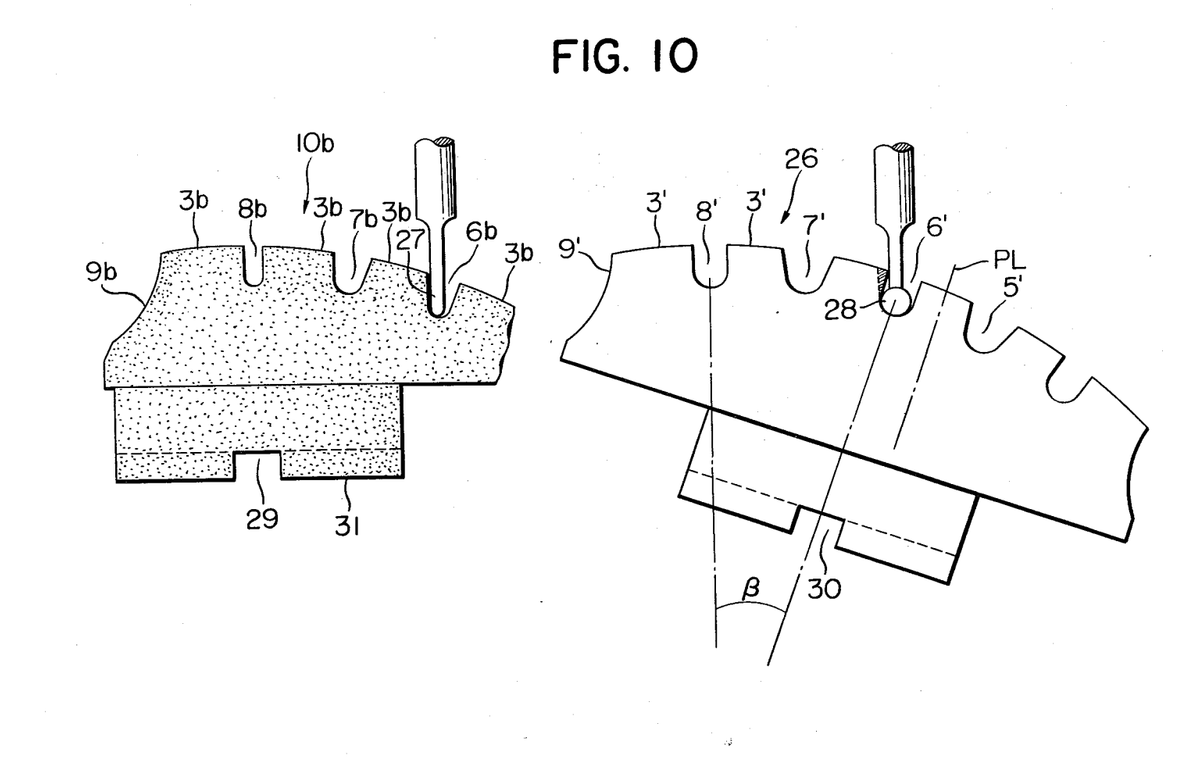

In FIG. 6 illustrating an example of the electrode manufacturing equipment for manufacturing electrodes used in this invention, the copying model 26 has a profile corresponding to that of the tire molding metal mold to be machined, as indicated in FIGS. 9 and 10. Both the milling head 32 for machining the workpiece 10′ with the rotating cutter 27 and the copying head 33 for causing the stylus 28 to slide on the surface of the copying model 26 to follow the profile of the copying model 26 are fixed to the head feed device 34. The head feed device 34 is constructed so as to move in the direction X (i.e., longitudinal feed), the direction Y (i.e., cross feed) and the direction Z (i.e., vertical feed) in FIG. 6 while interlocking the motion of the stylus 28 sliding on the surface of the copying model 26. Consequently, the cutter 27 machines the workpiece 10′ into a profile corresponding to that of the copying model 26 while moving in accordance with the sliding motion of the stylus on the surface of the copying model 26. The workpiece 10′ is placed on the work table 35 having the locating projection 36. The locating projection 36 is formed into the same profile as the electrode locating projection provided on the electrode mounting portion of the electrode mounting jig 11 fixed to the secong machining head 12 on the electric discharge machining equipment as shown in FIG. 5. Furthermore, the workpiece 10′ has the locating groove 29 engaging with the locating projection 36. The Workpiece 10′ is positioned on the work table 35 by engaging the locating groove 29 with the locating projection 36. In this way, the locating groove 29 is used as a reference for machining the discharge machining surface of the workpiece 10′ in the electrode manufacturing equipment of this invention and doubles as a locating means for mounting the electrode thus machined on the discharge machining equipment for manufacturing tire molding metal molds of this invention as shown in FIG. 5. Therefore, as long as the electrode thus machined in mounted on the discharge machining equipment by engaging the locating groove 29 with the electrode mounting jig 11 (shown in FIG. 4), the mispositioning of the electrode does not occur even when an electrode is replaced with that of a different profile during discharge machining. That is, in the tire molding metal mold manufacturing system of this invention in which electric discharge machining is performed by changing a plurality of interchangeable electrodes, the relative position between the discharge machining surface of each of the interchangeable electrodes and the mounting surface thereof to the electrode mounting jig is of critical importance. In this invention, the electrode mounting surface 31 and the electrode locating groove 29 are formed in advance on the workpiece 10′, as shown in FIGS. 9 and 10, for manufacturing the electrode from the workpiece 10′ using both the electrode mounting surface 31 and the electrode locating groove 29 as a reference. This results in high accuracy in positioning the discharge machining surface and the mounting surface of the electrode in the discharge machining equipment.

Figure 8A:
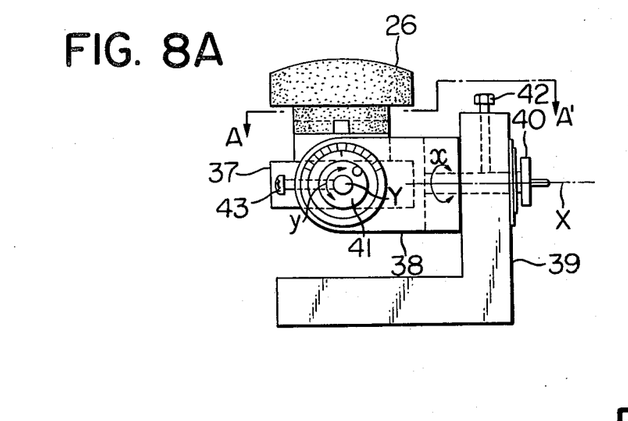
Figure 8B:
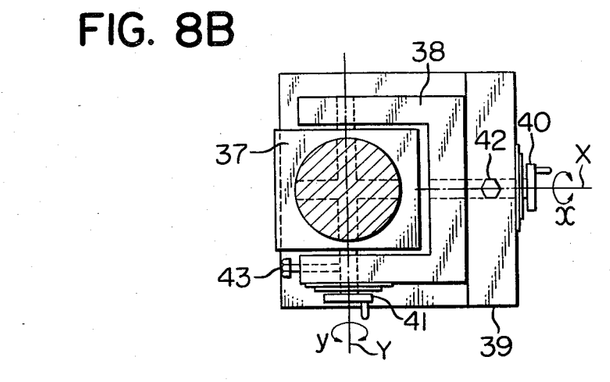

Next, the tilting mechanism of the copying model 26 will be described. The copying model 26 is placed on the model table 37, as shown in FIG. 6 (as shown in more detail in FIG. 8). The copying model 26 and the model table 37 have the same locating means as that in the workpiece 10′ and the work table 35 as described above for use in positioning the copying model 26 on the model table 37. As shown in FIG. 8, the model table 37 is supported by the bracket 38 in such a manner that the model table 37 can be rotated around the Y axis in a direction shown by the arrow y in the figure. The bracket 38 is supported by the bracket support 39 in such a manner that the bracket can be rotated around the X axis in a direction shown by the arrow x in the figure. That is, the bracket 38 can be tilted at a desired angle in a direction shown by the arrow x in the figure by operating the X-axis tilting handle, and the model table 37 can be tilted at a desired angle in a direction shown by the arrow y in the figure by operating the Y-axis tilting handle 41. The set bolts 42 and 43 are provided for fixing the abovementioned tilting angles. Thus, the copying model 26 can be held at any desired angles in both directions of x and y by operating the X-axis and Y-axis tilting handles 40 and 41.

Furthermore, the work table 35 is placed on the cross table 44 which can be moved in both longitudinal and cross feed directions, and the bracket support 39 supporting the model table 37 via the bracket 38 is placed on the cross table 45 which can be moved in both longitudinal and cross feed directions. That is, the work table 35 can be moved to any desired positions by operating the table feed handle 46 for moving the cross table 44 in the longitudinal feed direction and the table feed handle 47 for moving the same in the cross feed direction. On the other hand, the copying model 26 can be moved to any desired directions by operating the table feed handle 48 for moving the cross table 45 in the longitudinal feed direction and the table feed handle 49 for moving the same in the cross feed direction. Thus, the relative position between the workpiece 10' placed on the work table 35 and the model table 37 can be set to any desired positions.

FIGS. 9 and 10 show examples of the manufacture, using the electrode manufacturing equipment described above, of the electrodes used in this invention, for example the electrodes 10a and 10b as shown in FIG. 4. The electrode 10a is used for discharge machining the tire molding metal mold by feeding the electrode in a direction shown by the arrow a in FIG. 4 (B). Therefore, the grooves 8a and 9a of the electrode 10' must be formed into a profile corresponding to the profile obtained by removing the hatched portions in the grooves 8' and 9' of the copying model 26 as shown in FIG. 9 to eliminate unwanted metal removal in the projections 8 and 9 as shown in FIG. 4(A). To achieve this, this invention uses the stylus 28 for tracing the surface of the copying model 26 having a bulb-shaped tip, as shown in FIG. 9. The shape of the stylus tip may of course be of a J-shape. That is, the electrode 10a as shown in FIG. 4(B) is manufactured by positioning the copying model 26 in such a manner that the depth direction of the groove 6' of the copying model 26 is kept in a vertical position, causing the stylus 28 having a bulb-shaped or curved and bulged tip to trace the surface of the copying model 26, and causing the cutter 27 to follow the motion of the stylus 28, as shown in FIG. 9. Since the electrode 10a is an electrode for machining the lower mold 2, it is sufficient to copy the lefthand portion in the figure of the parting line PL of the copying model 26. As a result, the contour surface 3a, the grooves 6a and 7a, each corresponding to the contour surface 3', the grooves 6' and 7' of the copying model 26 are formed on the electrode 10a. Also, the grooves 8a and 9a of a profile corresponding to the profile of the grooves 8' and 9' with the hatched portions removed are formed on the electrode 10a.

Next, the manufacture of the electrode 10b as shown in FIG. 4(C) will be described. The electrode 10b is used for discharge machining the workpiece by feeding the electrode in a direction shown by the arrow b in FIG. 4(C). Therefore, the depth direction of the groove 8b of the electrode 10b must be in the direction b, or vertical to the electrode mounting surface 31. To achieve this, the copying model 26 is positioned so that the depth direction of the groove 8' on the model 26 is kept at a vertical position by tilting the copying model 26 clockwise by an angle β, as shown in FIG. 10, from the state shown in FIG. 9. Thus the electrode 10b of a desired shape can be obtained by causing the stylus 28 to trace the lefthand portion of the parting line PL of the copying model 26, and causing the cutter 27 to machine the workpiece while following the motion of the stylus 28. Provision of the stylus 28 having a bulb-shaped tip permits the contour surface 3b, the grooves 7b, 8b and 9b of the electrode 10b to be formed into a profile corresponding to that of the copying model 26, and only the groove 6b to be formed into a profile that can eliminate unwanted metal removal in discharge machining tire molding metal molds, that is, the profile of the groove 6' of the model 26 with the hatched portion removed, as shown in FIG. 10. In addition, the widths of the grooves 6' through 9' formed on the copying model 26 are appropriately determined in advance, taking into account the relationship between the diameters of the stylus 28 and the cutter 27, to obtain the electrodes 10a and 10b of desired profiles.

As described above, the electrode manufacturing equipment of this invention for copy machining a plurality of electrodes of different types for use in the discharge machining equipment for discharge machining tire molding metal molds with those interchangeable electrodes makes it possible to manufacture a plurality of electrodes having high accuracy in maintaining the relative position between the discharge machining surface and the electrode mounting surface of each of the electrodes by making the tilting angle of the copying model adjustable to any desired angles, using the stylus having a bulb-shaped tip or a curved bulged tip as necessary, and machining the electrode by setting the workpiece on the work table having a locating means of the same shape as that of the electrode locating means on the electrode mounting jig in the discharge machining equipment. In addition, the electrode manufacturing equipment of this invention makes it possible to reduce the manufacturing costs of electrodes.

In the foregoing, description has been made on the electrode manufacturing equipment as shown in FIGS. 6 through 10. However, it is needless to say that this invention is not confined to the type of the electrode manufacturing equipment shown in those figures, but a multiplicity of electrodes of the same profile may be manufactured with a numerically controlled machine tool, for example, after determining the profile and dimensions of the required electrode.

Figure 11:
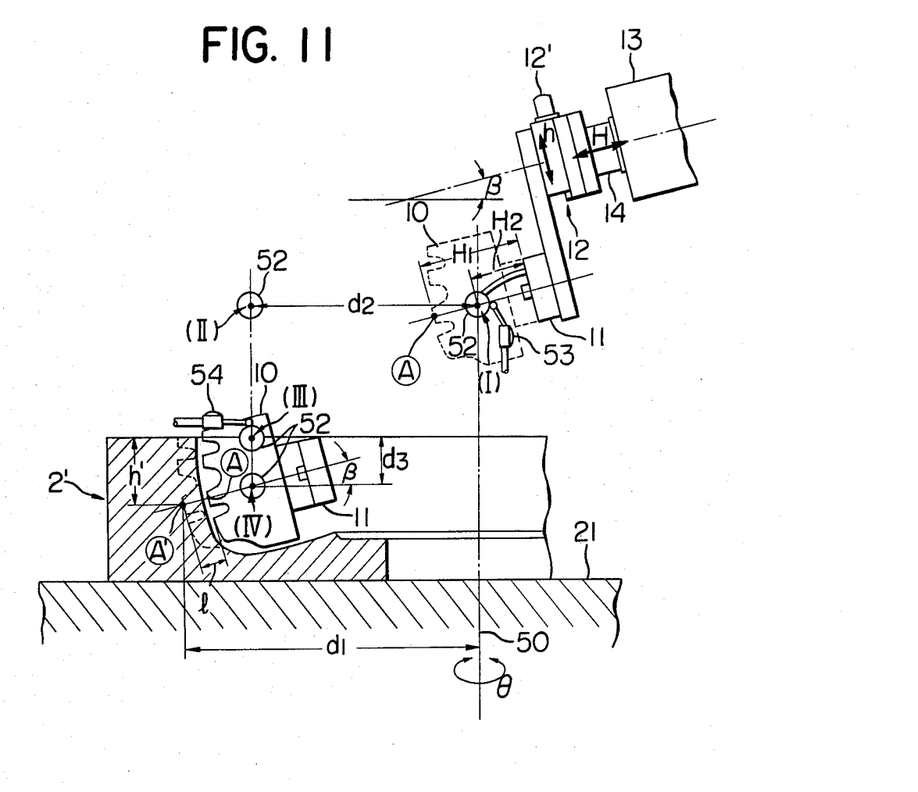
FIG. 11 is a diagram of assistance in explaining the process of setting the relative position between the discharge machining electrode and the workpiece in this invention.

Next, a means for positioning the electrode and the workpiece, more particularly for positioning the electrode at a discharge machining start position will be described, referring to FIGS. 5 through 11. In FIG. 11 illustrating the electrode positioning process, numerals 2', 10 through 14 and 21 correspond to like numerals in FIG. 6. Numeral 50 refers to the rotating centerline of the work table 21; 51 to the horizontal upper surface of the workpiece 2'; 52 to a reference jig; and 53 and 54 to indicators, respectively. Symbol Ⓐ refers to an electrode reference point; Ⓐ' to a reference point at which machining is complete, respectively.

Now, the electrode positioning process of this invention will be described in sequence of machining, referring to FIGS. 5 and 11.

(1) In placing the workpiece 2' on the work table 21, the workpiece 2' is first centered on the rotating center of the work table 21.

(2) Next, the following relevant values for indicating the discarge start position of the electrode 10 are confirmed.

(i) Feeding angle of the electrode 10 (an angle shown by the arrow β in the figure).

(ii) Feeding stroke of the electrode 10 (a distance shown by the arrow 1 in the figure).

(iii) The coordinates of the predetermined end-of-machining reference point A' at which the reference point A on the machining surface of the electrode 10 arrives after the electrode 10 is fed by the distance 1. That is, the horizontal distance d1 of the end-of-machining reference point A' from the centerline 50 of the workpiece 2' and the vertical distance h' of the end-of-machining reference point A' from the horizontal upper surface 51 of the workpiece 2'.

(3) The head support 15 is then rotated by means of the head rotating drive unit 16 as shown in FIG. 5 to set the tilting angle of the first machining head 13, or the angle of the first machining head 13 to the surface of the work table 21, in a direction shown by the arrow H in the figure at $\beta$.

(4) Next, the reference jig 52 for positioning the electrode 10 is mounted on the electrode mounting portion 11. In general, the reference jig 52 may be of such a type that a predetermined reference point serving as a positional reference for the reference jig 52 can be accurately measured by a suitable position measuring means such as an indicator. As shown in the example shown in FIG. 11, it is desired that the reference jig 52 be constructed of a ball-shaped piece supported by a supporting arm, as shown in the figure, with the center of the ball-shaped piece used as a jig reference point in the interest of convenience in measuring the position of the jig reference point with the indicator 53. The reference jig 52 is set in such a manner that the center of the reference jig 52 lies on the vertical line from the electrode reference point A to the electrode mounting portion 11 (needless to say, the reference jig 52 is set with the electrode 10 removed). In the foregoing, it has been described in the interest of simplicity that the reference jig 52 is set in such a manner that the electrode reference point agrees with the center of the reference jig 52 on the vertical line. In practice, however, it is sufficient to establishd the relative position of the electrode reference point A and the reference jig 52.

(5) Next, the work table 21 is moved so that the center of the reference jig 52 agrees with the rotational centerline 50 (centerline of the workpiece 2') of the work table 21 by moving the first table 23 as shown in FIG. 5 in a direction shown by the arrow X in the figure and the second table 24 in a direction shown by the arrow Y in the figure. In order to confirm the agreement of the center of the reference jig 52 with the rotational centerline 50 of the work table 21, the relative position is established by confirming whether the indicator 53 mounted on the work table 21 properly slides on the spherical surface of the reference jig 52 by rotating the work table 21 in a direction shown by the arrow $\theta$ in the figure. During this operation, the first machining head 13 may be set at any height from the workpiece 2'.

(6) The relative position of the reference jig 52 with respect to the workpiece 2' is shifted from the position (I) to the position (II) in FIG. 11 by moving the first table 23 as shown in FIG. 5 rightward in the figure. The travelling distance d2 of the first table 23 can be expressed by the following equation.

$$d2 = d1 - \{1 + (H1 - H2)\} \cos \beta$$

where H1 is the vertical distance of the electrode reference point A from the electrode mounting portion 11, H2 is the vertical distance of the reference jig 52 from the electrode mounting portion 11.

(7) Next, the reference jig 52 is moved from the position (II) to the position (III) in FIG. 11 by lowering the first machining head 13 by vertically lowering the lifting block 17 as shown in FIG. 5. The position (III) in the figure represents a position at which the center of the reference jig 52 lies on the extension of the horizontal upper surface 51 of the workpiece 2'. Whether or not the reference jig 52 is on the position (III) can be accurately confirmed by determining the position from the horizontal upper surface 51 using the indicator 54.

(8) The reference jig 52 is then moved from the position (III) to the position (IV) in the figure, in the same manner as in (7) above. The travelling distance d3 of the reference jig 52 can be expressed by the following equation.

$$d3 = h' - \{1 + (H1 - H2)\} \sin \beta$$

The position obtained in the aforementioned processes (1) through (8) represents a predetermined discharge machining starting point for the electrode 10. That is, after the processes (1) through (8) are completed to obtain the starting point, discharge machining can be started by replacing the reference jig 52 with the electrode 10. Even if the machining head 13, for example, is lifted to change electrodes after the establishment of the starting point, it is easy to return the start point to the starting point after electrode change by remembering the lifted distance. Once the starting point is established in the processes (1) through (8), it is easy to return the relative position of the workpiece 2' and the machining head 13 to the starting point by using the starting point as a reference point for the relative movement of the workpiece 2' and the machining head 13. Needless to say, the positioning of the absolute coordinate position (with respect to the discharge machining equipment) of the jig reference point of the reference jig 52 in the initial stage permits the subsequent positioning of the machining head 13 to be automatically performed by means of an NC unit, for example. Where the aforementioned absolute coordinate position can be determined in advance, it is of course possible to obtain the starting point by giving the amount of movement of each coordinate system from the absolute coordinate position.

Since the positioning of the electrode and the workpiece, more particularly, the setting of the electrode to the discharge starting point can be easily performed by the abovementioned processes (1) through (8), machining accuracy in the tire molding metal mold manufacturing system of this invention can be improved.

Figure 12A:
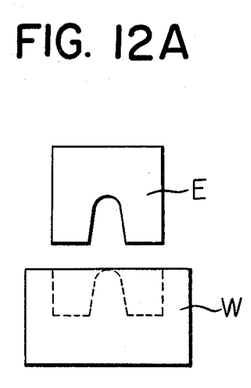
Figure 12B:
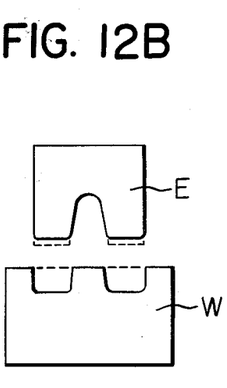
Figure 12C:
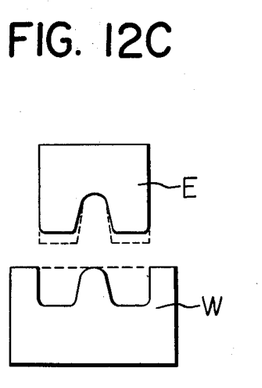
Figure 13A:
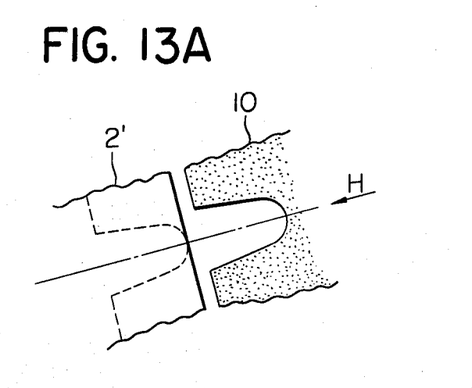
FIG. 13 is a diagram of assistance in explaining the machining process of sharp edges on a tire molding metal mold according to this, invention, respectively.
Figure 13B:
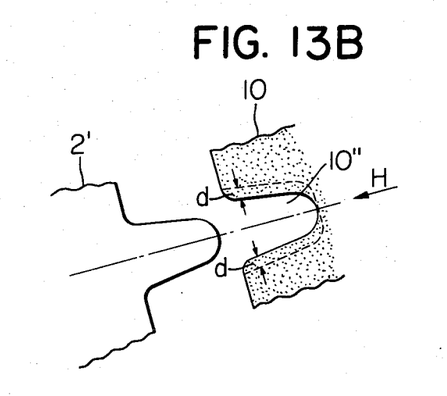

As is generally known, the occurrence of electrode wear to some extent or other is an inevitable problem in discharge machining. FIGS. 12(A), (B) and (C) show examples of the process of electrode wear caused by discharge machining. In the figure, symbol E refers to an electrode; and W to a workpiece, respectively. The electrode E before discharge machining, as shown in FIG. 12(A), wears out as discharge machining proceeds, as shown in FIGS. 12(B) and (C). Severe wear occurs particularly at the edge portions, rounding the edges of the electrode and accordingly the corners of the machined workpiece. In order to bring about a profile having sharp corners as shown by a dotted line in FIG. 12(A), therefore, it is necessary to finish the workpiece by repeatedly replacing the electrode with new ones as shown in FIG. 12(A) after the machining process as shown in FIG. 12(C). In view of the fact that the angle between the grooves formed on the tire and the tire tread is required to be a sharp right angle, the angle between the side walls of the projections 6 through 8 and the contour surface 3 on a tire molding metal mold such as the lower mold as shown in FIG. 4(A) must be finished as sharp as possible. As described above, however, the wear of the electrode during discharge machining, which occurs most severely at the edges of the electrode as shown in FIGS. 12(A), (B) and (C) makes it difficult to form sharp corners on the workpiece. In the discharge machining equipment (shown in FIG. 5) of this invention, it is made possible to finish the corners of the mold to be machined into a sharp angle using the functions of the second machining head 12 and the work table 21 which can be servo-driven. That is, the discharge machining equipment of this invention as shown in FIG. 5 has the second machining head 12 fixedly fitted to the tip of the spindle 14 of the first machining head 13 which is automatically servo-driven in a direction shown by the arrow H in the figure by the pulse motor 13'. The second machining head 12 is constructed in such a manner as to automatically servo-drive the electrode 10 in a direction shown by the arrow h in the figure by the pulse motor 12' via the electrode mounting jig 11. The work table 21 is constructed so as to be automatically servo-driven in a direction shown by the arrow $\theta$ in the figure by the table rotating drive unit 22. Now, assume that the workpiece 2' is discharge machined into a profile shown by a dotted line in FIG. 13(A) by automatically servo-driving the electrode 10 in a direction shown by the arrow H in the figure. The edges of the electrode 10 are rounded due to the wear of the electrode, as shown in FIG. 13(B). As a result, the workpiece 2' is rounded at the corners thereof, instead of being formed into a desired profile as shown by a dotted line in FIG. 13(A). To overcome this problem, it is necessary to machine the side-walls of the groove 10" of the worn-out electrode 10 to an extent shown by a dotted line in FIG. 13(B), that is, to an extent that the rounded edges are removed. Symbol d in the figure represents the width of metal removal. In practice, however, a separate electrode the groove of which is expanded in advance is used, instead of re-machining the worn-out electrode.

Thus, the electrode 10 having an expanded groove is first fed by a predetermined length in a direction shown by the arrow H in the figure, and then automatically servo-driven by the distance d in any of the directions shown by the arrow h by the second machining head 12 shown in FIG. 5 to remove the rounded corner on any one side of the workpiece 2'. Then, the electrode 10 is automatically servo-driven by the distance 2d in the other direction of the directions h to remove the rounded corner on the other side of the workpiece 2'. As a result, the projection 2" on the workpiece 2' can be machined to a profile having sharp corners as shown by a dotted line in FIG. 13(A). The feeding distance of the electrode 10 in the directions H and h during the aforementioned discharge machining can be set to a predetermined range by a limit switch etc. That is, the automatic servo-driving of the electrode 10 in the direction H in FIG. 13 is carried out by the first machining head 13 until an H-direction limit switch (not shown) is actuated. The automatic servo-driving in the direction h is started by the second machining head 12 after the limit switch is actuated to stop the H-direction feeding. In case the electrode 10 and the workpiece 2' is shortcircuited during discharge machining in the h-direction, the electrode 10 is immediately withdrawn by a predetermined distance in directions opposite to the directions H and h. This withdrawal distance can also be set by presetting the number of pulses to be transmitted to the machining head, for example. After temporarily withdrawn, the electrode 10 is fed again in the direction H and then in the direction h to continue machining. The withdrawal operation of the electrode 10 may be performed in both direction H and h, or first in the direction h and then in the direction H.

Figure 13C:
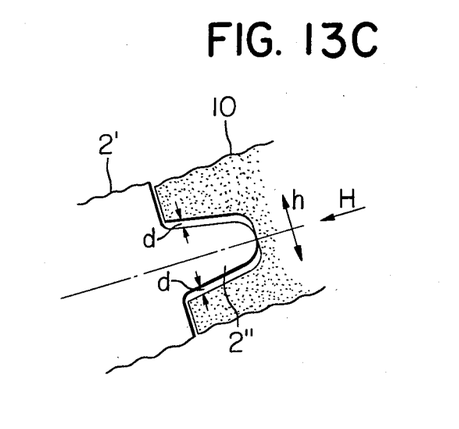

Furthermore, if the rounded corner exists in a direction parallel to the surface of the work table 21, though not shown in the figure, the rounded corner can be removed by automatically servo-driving the work table 21 in a direction shown by the arrow $\theta$ in FIG. 5. In this case, the relative movement of the electrode 10 and the workpiece 2' is performed by the automatic servo-driving of the work table 21 in the direction $\theta$, instead of the automatic servo-driving of the electrode 10 in the direction h by the second machining head 12, as described in FIG. 13. As to the machining operation in this case, which is exactly the same as the machining as described above and can be easily understood, detailed description is not given here.

In the foregoing, the method of discharge machining to remove rounded corners existing in a direction parallel to a direction shown by the arrow h or $\theta$ in FIG. 5 has been described. However, rounded corners do not always exist only in a direction parallel to the direction h or $\theta$ on a tire molding metal mold, but can generally exist in any other directions. In removing those rounded corners existing in other directions, therefore, the automatic servo-driving of the second machining head 12 in the direction h in FIG. 5 and the automatic servo-driving of the work table 21 in the direction $\theta$ in FIG. 5 are simultaneously carried out while controlling the movement of the electrode 10 in accordance with the directions of the rounded corners by setting the automatic servo-driving rates in both directions h and $\theta$ at the same rate or changing those rates with each other, to remove the rounded corners existing in any other directions. It is needless to say that the automatic servo-driving operation in a direction shown by the arrow H in FIG. 5 and the automatic servo-driving operations in the directions h and $\theta$ are interlocked in the same manner as described, referring to FIG. 13.

As described above, this invention makes it possible to provide a tire molding metal mold manufacturing system with electric discharge machining capable of manufacturing tire molding metal molds made of a single material and composed of a single block by discharge machining a workpiece by changing the electrode feeding angle and changing electrodes of predetermined profiles in accordance with the respective electrode feeding directions, and capable of efficiently manufacturing tire molding metal molds of desired profiles by providing a manufacturing means for manufacturing the electrodes of predetermined profiles with accuracy and a positioning means for easily positioning the electrode and the workpiece during discharge machining.

What is claimed is:

1. A tire molding metal mold manufacturing method using electric discharge machining for machining a tire molding metal mold having an integrally formed tire molding surface consisting of a predetermined curved surface corresponding to the outer circumference of a tire to be molded and a plurality of projections protruding on said tire molding surface, comprising the steps of:

providing an electrical discharge machining equipment having a machining head for feeding a machining electrode which is disposed at a predetermined angular position, in a feeding direction of said angular position, and having a rotatable head support for supporting said machining head at said predetermined angular position; providing a plurality of machining electrodes each having a portion corresponding to a common reference plane determined by the curved surface of said tire molding surface and recesses corresponding to at least one projection protruding on said tire molding surface, a part of said reference plane and a part of said recesses being formed into such a shape so as to prevent excess metal removal during discharge machining, in relation to the feeding direction of said angular position; mounting one of said machining electrodes to said machining head; setting said machining head at a first predetermined angular position corresponding to said one of said machining electrodes; machining a workpiece being machined by feeding said one of said machining electrodes in a feeding direction of said first angular position while preventing excess metal removal; replacing said one of said machining electrodes with another one of said machining electrodes; and machining a portion of said workpiece left unmachined during the step of preventing excess metal removal, using said other one of said machining electrodes.

2. A tire molding metal mold manufacturing method electric discharge machining as set forth in claim 1 characterized in that, when the three-dimensional coordinates of space are expressed as the X, Y and Z axes, respectively, the electric discharge machining equipment has movable axes expressed as an $\alpha$ axis rotating on the X-Z plane with respect to the Y axis, a $\theta$ axis rotating on the X-Y plane with respect to the Z axis, and a linear H axis the tilting angle of which is determined by the $\alpha$ axis, respectively.

3. A tire molding metal mold manufacturing method using electric discharge machining as set forth in claim 2 characterized in that the electrode discharge machining equipment has movable axes expressed as the X, Y and Z axes representing the three-dimensional coordinates of space, an $\alpha$ rotating on the X-Z plane with respect to the Y axis, a $\theta$ axis rotating on the X-Y plane with respect to the Z axis, a linear H axis the tilting angle of which is determined by the $\alpha$ axis, and a linear h axis intersecting with the H axis, respectively.

4. A tire molding metal mold manufacturing method using electric discharge machining as set forth in claim 1 characterized in that a reference point for electric discharge machining in which the feeding of said machining electrodes is carried out at a plurality of predetermined angular positions is determined by setting a positioning reference jig on an electrode mount of said machining head and relating a predetermined jig reference point in said reference jig to a predetermined spatial reference origin.

5. A tire molding metal mold manufacturing method using electric discharge machining as set forth in claim 4 characterized in that said machining head is set at a discharge machining start position by first causing said jig reference point to agree with said reference origin, and then causing said jig reference point to agree with a machining start origin which is predetermined taking into consideration the distance between said jig reference point and a predetermined electrode reference point on said machining electrode which is presumed to be mounted on said electrode mount in place of said reference jig.

6. A tire molding metal mold manufacturing method using electrical discharge machining as set forth in claim 1 characterized in that the discharge machining starting point of the machining head is determined by specifying information of the distance thereof from the spatial reference origin of X, Y, Z $\alpha$, $\theta$, and H axes, wherein the three-dimensional coordinates of space are represented by the X, Y, and Z axes, respectively, $\theta$ is an axis of rotation on the X-Y plane with respect to the A axis, the $\alpha$ axis is an axis of rotation on the X-Z plane with respect to the Y axis, and the H axis is at a tilted angle with respect to the $\alpha$ axis.

7. A tire molding metal mold manufacturing method using electric discharge machining as set forth in claim 3 characterized in that said machining head for feeding said machining electrode comprises first and second machining heads; one of said second machining head and a machining table for the workpiece being controlled and driven within a predetermined range, provided that the feeding distance of said first machining head reaches a predetermined distance.

8. A tire molding metal mold manufacturing method using electrical discharge machining as set forth in claim 7 characterized in that, should a shortcircuiting occur between the machining electrode and the workpiece during discharge machining, one of the first machining head, the second machining head and the work table are caused to withdraw unitl one or more predetermined distances are reached in a direction opposite the feeding direction and to resume discharge machining from the withdrawal position.

9. A tire molding metal mold manufacturing method using electrical discharge machining as set forth in claim 4 characterized in that the reference jig has a groove for engaging with an electrode mounting projection provided on the electrode mount, and a spherical piece serving as a positioning reference.

10. A tire molding metal mold manufacturing method using electrical discharge machining as a set forth in claim 9 characterized in that the center of the spherical piece of the reference jig serves as a jig reference point and the spatial reference origin is positioned on a $\theta$ axis which is the rotational axis of a work table on which a workpiece is placed.

11. A tire molding metal mold manufacturing method using electrical discharge machining as set forth in claim 5 characterized in that electrical discharge machining is started at the discharge machining starting position by replacing the reference jig with the machining electrode after moving, or without moving, the machining head to a desired position based on the discharge machining starting position of the machining head.

12. A tire molding metal mold manufacturing method using electrical discharge machining as set forth in claim 3 characterized in that the machining head for feeding the machining electrode comprises first and second machining heads each having a servo-drive mechanism for keeping a machining gap constant; a second machining head being fixed on an end of the first machining head spindle, and the machining electrode being supported by the second machining head via the electrode mounting jig.

13. A tire molding metal mold manufacturing method using electrical discharge machining as set forth in claim 3 characterized in that a work table on which a workpiece is placed is rotatable by means of a table rotating drive unit having a servo-drive mechanism.

14. A tire molding metal mold manufacturing method using electrical discharge machining as set forth in claim 8 characterized in that the withdrawal of the first machining head in a direction opposite to the feeding direction is started with a time lag behind the start of the withdrawal of the second machining head and/or the work table.

15. An electrical discharge machining equipment for use in manufacturing tire molding metal molds having a work table on which a workpiece is placed and a machining head for feeding a machining electrode and constructed in such a manner that said machining head feeds said machining electrode so that said machining electrode maintains a predetermined discharge gap with respect to the workpiece, whereby electrical discharge is caused between said machining electrode and the workpiece to discharge machine the workpiece with the discharge energy thus generated and, characterized in that there are included a head support for supporting said machining head; a head rotating drive unit for rotatably supporting said head support; a lifting block is supported by a column in such a manner that said lifting block is lifted or lowered, together with said head rotating drive unit mounted thereon; a table rotating drive unit for rotating said work table mounted thereon; a first table for longitudinally feeding said table rotating drive unit mounted thereon; a second table for cross feeding said first table mounted thereon; and machining electrodes each having portions corresponding to a reference plane determined by a continuously curved surface formed by machining and recesses corresponding to one or more projections protruding on said reference plane and formed into such a shape so as to prevent the excess metal removal of a part of said reference plane and a part of said projections, during discharge machining, with respect to each of the respective feeding angles thereof.

16. An electrical discharge machining equipment for use in manufacturing the molding metal molds as set forth in claim 15 characterized in that a milling head is provided on the head support for mechanical machining the workpiece.

17. An electrical discharge machining equipment as claimed in claim 15 characterized in that said electrical discharge machining equipment is constructed so that the shortest distance between the central axis of the machining head spindle and the rotational center axis of the head support is larger than a predetermined distance.

18. An electrical discharge machining equipment, as set forth in claim 17, characterized in that said machining electrode corresponds to a copying model which has a form corresponding to a profile of the outer circumference of a tire to be molded.

19. An electrical discharge machining equipment as set forth in claim 17, characterized in that the machining electrode corresponds to a workpiece made by a numerical control unit based on dimensional information given in accordance with the profile of the outer circumference of a tire to be molded.

20. An electrical discharge machining equipment as set forth in claim 18 or 19 characterized in that a locating groove for engaging with an electrode mounting projection provided on an electrode mounting jig in said electrical discharge machining equipment is provided on said workpiece.

21. An electrical discharge machining equipment as set forth in claim 20 characterized in that a locating projection of the same profile as the profile of said electrode mounting projection provided on said electrode mounting jig in said electrical discharge machining equipment is provided on a work table on which said workpiece is placed for setting said workpiece on said work table by engaging said locating groove of said workpiece with said locating projection of said work table.

22. An electrical discharge machining equipment as set forth in claim 18 characterized in that a machining electrode of a desired profile for preventing excess metal removal corresponds to a workpiece made in accordance with the profile of a copying model by tilting said copying model in a predetermined direction and at a predetermined angle corresponding to a machining electrode to be machined.

23. An electrical discharge machining equipment as set forth in claim 22 characterized in that a stylus for tracing said copying model has one of a curved and bulged tip.

24. A tire molding metal mold manufacturing system with electrical discharge machining for machining, using an electrical discharge machining equipment, a tire molding metal mold having integrally a tire molding surface consisting of a predetermined curved surface corresponding to the outer circumference of a tire being molded and a plurality of projections protruding of said tire molding surface, characterized in that an electrical discharge machining equipment having at least a work table for holding a workpiece; a table drive unit for rotatably driving said workpiece; a second machining head for feeding a machining electrode; a first machining head for feeding said second machining head of said machining electrode; and a head support for rotatably supporting said first machining head and constructed so as to permit the positioning of said workpiece and said machining electrode and the setting of the feeding angle of said machining electrode is used; there are provided one or more types of machining electrodes manufactured in such a manner that a workpiece on which a locating groove corresponding to a locating projection provided on said machining head is provided, is copy machined using said locating groove as a reference, by means of a cutter having a predetermined positional relationship with a stylus tracing the surface of a copying model having a profile corresponding to the profile of a tire being molded and tilted at an angle determined in accordance with the feeding angle of said machining electrode; each of said machining electrode having a portion corresponding to a common reference plane determined by the curved surface of said tire molding surface and one or more recesses corresponding to one or more projections protruding on said tire molding surface; a part of said reference plane and a part of said projections being formed into such a shape as to prevent excess metal removal in relation to the angle of the feeding direction of each thereof; and the excess metal removal of said projections provided on said tire molding surface of a tire molding metal mold to be machined is prevented by discharge machining said workpiece by changing said machining electrodes in accordance with the electrode feeding angle of said machining head.

* * * * *